D. TRUE.

SOCKETS FOR BOAT-KNEES.

No. 7,065. Reissued April 18, 1876.

David True
INVENTOR

WITNESSES
R. A. George
J. H. Gately

By his Attys.
Henry W. Williams & Co

N. PETERS, PHOTO-LITHOGRAPHER, WASHINGTON, D. C.

UNITED STATES PATENT OFFICE.

DAVID TRUE, OF SALISBURY, MASSACHUSETTS.

IMPROVEMENT IN SOCKETS FOR BOAT-KNEES.

Specification forming part of Letters Patent No. 174,595, dated March 7, 1876; reissue No. 7,065, dated April 18, 1876; application filed April 8, 1876.

*To all whom it may concern:*

Be it known that I, DAVID TRUE, of Salisbury, in the county of Essex and State of Massachusetts, have invented a new and useful Socket for Boat-Knees; and I do hereby declare that the following is a full, clear, and exact description thereof, reference being had to the accompanying drawings, and to the letters of reference marked thereon.

This invention relates to the construction of boat-knees, such as are found in dories and other like flat-bottomed craft. The knees have been heretofore made by bending timber into the proper shape. There are some objections to the use of artificially-bent boat-knees, perhaps the main objection being the natural tendency of the wood to resume its original shape. By means of my invention all bending of the wood is done away with, and a strong and durable boat-knee produced, especially suitable for use in connection with dories and similar boats.

The nature of the invention in detail is fully described below.

Figure 1:
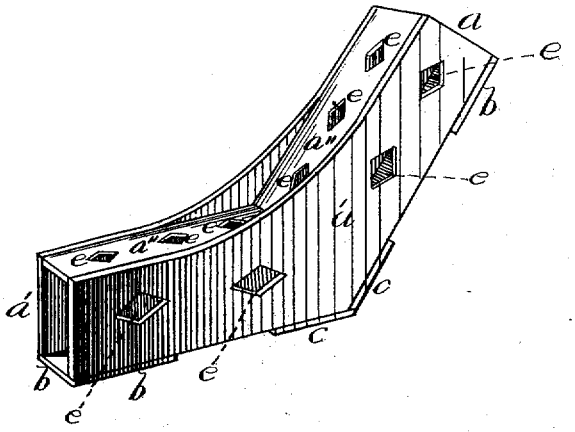
Figure 2:
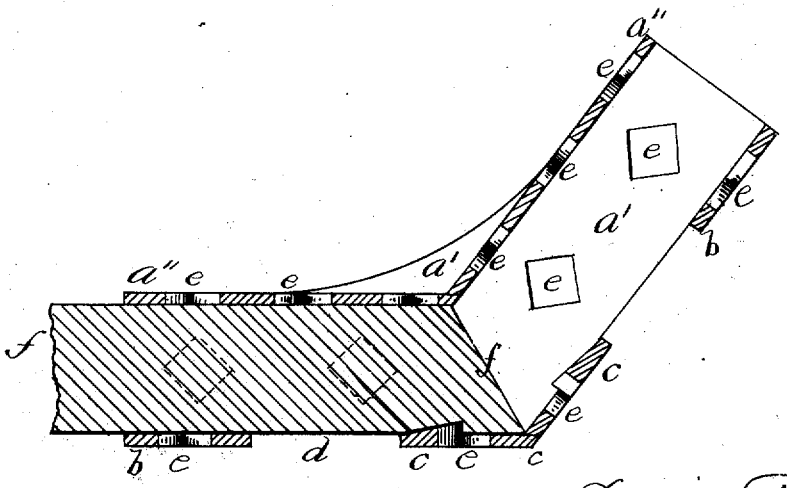

In the accompanying illustration, Figure 1 is a view in perspective of my socket. Fig. 2 is a longitudinal section of the same, one of the two timbers in the knee being represented in its proper position.

Similar letters of reference indicate corresponding parts.

*a* represents a malleable-iron socket, made elbow-shaped, and as thin as practicable, so as to insure lightness. It will not probably be over one-tenth to one-eighth of an inch in thickness. Of course any other metal could be used, if desired. *a'* represents the sides, and *a''* the top, of the socket. The bottom of the socket consists of the parts *c* and *b*. By leaving the space *d* between the cross-pieces *b* and *c*, any water which may enter the boat from any cause will have an opportunity to flow freely under the knees, so as to prevent its massing at any particular point in the boat between any two boat-knees or sockets. In order to lighten the weight of the socket, openings *e* are made in the bottom, sides, and top of the casting, of any desired shape and in any number and position. It will be noticed, by referring to Fig 2. of the drawing, that the cross-pieces *c c* are made of peculiar shape. The outer half of each is made wedge-shaped, while the inner half is of substantially the same thickness as the cross-pieces *b*. *f* represents a timber made of the proper size to form a portion of the boat-knee, and of the proper shape to fit over the cross-piece *c*. Before this timber *f* is placed into the position shown in Fig. 2 it is steamed, or submitted to some other process which thoroughly softens it. After it is sufficiently soft, it is forced into the socket over the wedge-shaped piece *c*, and into the position shown in Fig. 2. Another timber is forced into the opposite end of the socket in a similar manner to the timber *f*. The timbers swell and fill all parts of the socket, and are prevented from being withdrawn by the wedge-shaped pieces *c*. The bottom planks may be nailed to the knee through the openings *e* or *d*, as desired. The swelling of the timbers into the openings *e* adds to its firmness in the socket. It will thus be seen that a firm, durable, and stiff boat-knee is constructed, without bending the timber, by means of my metallic elbow-socket.

Having thus fully described my invention, what I claim, and desire to secure by Letters Patent, is—

1. As a new article of manufacture, a metallic elbow-socket so constructed as to inclose and hold the inner ends of two portions of a boat-knee.

2. The above-described elbow-socket, provided with the openings *e*, substantially as and for the purpose set forth.

3. In a metallic elbow-socket for boat-knees, the wedge-shaped plates *c c*, substantially as and for the purpose herein specified.

4. The above-described elbow-socket, having the space *d* left between plates or cross-pieces *b* and *c*, for the purpose of allowing the flow of the water in the bottom of the boat, as above described.

DAVID TRUE.

Witnesses:
HENRY W. WILLIAMS,
R. A. GEORGE.